No. 890,362. PATENTED JUNE 9, 1908.
L. H. KINNARD.
TIRE PROTECTING DEVICE.
APPLICATION FILED NOV. 14, 1904. RENEWED JULY 6, 1907.
2 SHEETS—SHEET 1.
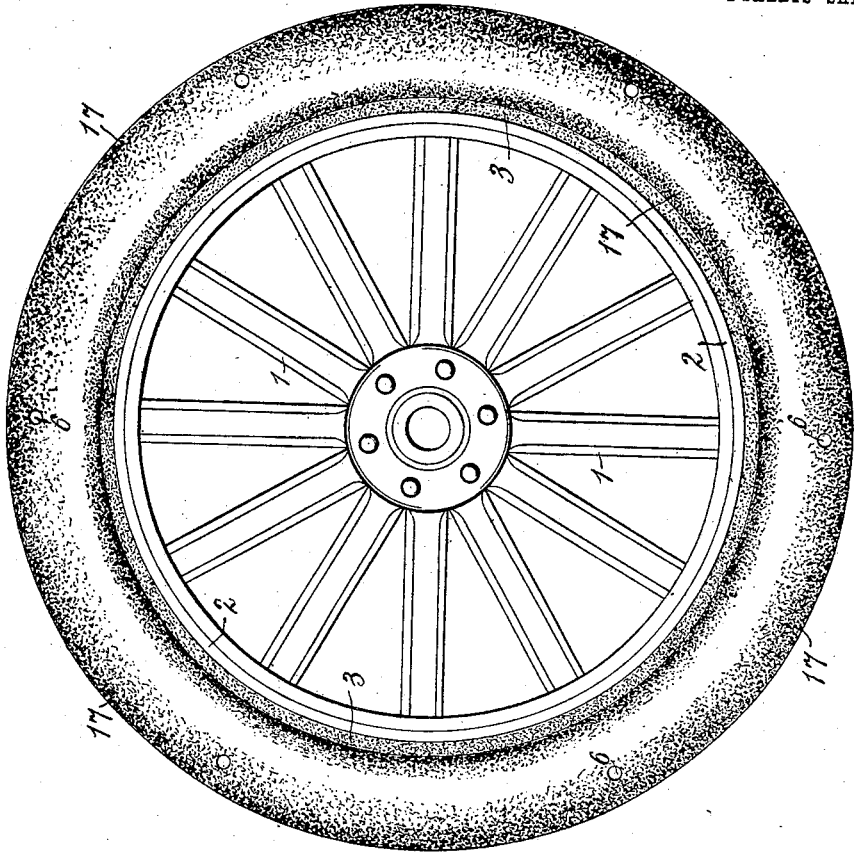
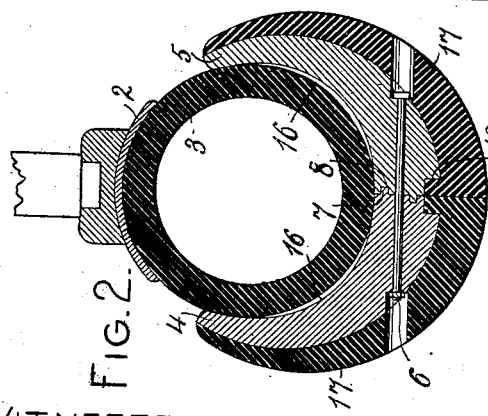
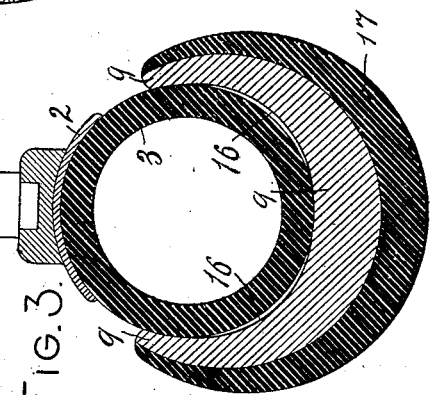
WITNESSES.
Wm. W. Shaw
Frank H. Wimmel
INVENTOR:
Leonard H. Kinnard,
By Daniel A. Carpenter,
HIS ATTORNEY No. 890,362.  
PATENTED JUNE 9, 1908.  
L. H. KINNARD.  
TIRE PROTECTING DEVICE.  
APPLICATION FILED NOV. 14, 1904. RENEWED JULY 6, 1907.

2 SHEETS—SHEET 2.

WITNESSES:  
Wm. H. Shaw  
Frank H. Wimmel

INVENTOR.  
Leonard H. Kinnard  
By  
Daniel A. Carpenter,  
HIS ATTORNEY.

UNITED STATES PATENT OFFICE.

LEONARD H. KINNARD, OF HARRISBURG, PENNSYLVANIA, ASSIGNOR OF ONE-HALF TO ROLLIN S. CHAMBERLIN, OF HARRISBURG, PENNSYLVANIA.

TIRE-PROTECTING DEVICE.

No. 890,362.     Specification of Letters Patent.     Patented June 9, 1908.

Application filed November 14, 1904, Serial No. 232,554. Renewed July 6, 1907. Serial No. 382,473.

*To all whom it may concern:*

Be it known that I, LEONARD H. KINNARD, a citizen of the United States, and a resident of Harrisburg, in the county of Dauphin and State of Pennsylvania, have invented a certain new and useful Improvement in Tire-Protecting Devices, of which the following is a full, clear, and exact description, reference being made to the accompanying drawings, forming part of this specification.

This invention relates to improvements in tire-protecting devices which are especially applicable to the pneumatic tires of automobiles and other heavy vehicles. Its object is to effectually protect such tires, with their good qualities retained, from various injuries including punctures, cuts, ruptures etc., to which they are commonly exposed and which often suddenly render them useless.

The invention consists of the peculiar tire-protecting device which is hereinafter described and claimed.

Figure 4:
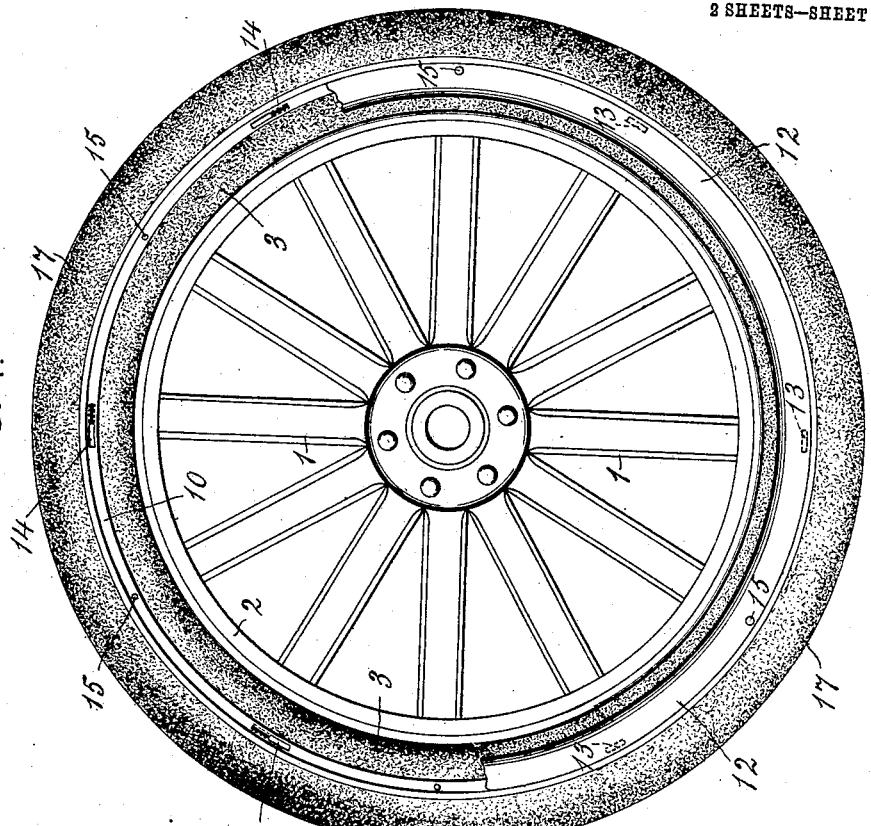

On the accompanying sheets of drawings, Figure 1 is a side view of a vehicle-wheel to which the invention is applied in a particular form; Fig. 2, a cross-section of the rim of this wheel and of the tire and protecting-device; Fig. 3, a cross-section of a wheel-rim and tire and of the protecting-device in a form differing from that shown in Figs. 1 and 2; Fig. 4, a side view of a vehicle-wheel and of another form of the tire-protecting device; and Fig. 5, a cross-section of the wheel-rim, tire, and protecting-device of Fig. 4.

Similar reference-numerals designate like parts in different views.

Each form of the protecting-device shown comprises an annular shield which encompasses the tire and which is sufficiently stiff and strong to be capable of retaining its true shape as the tire spreads under the action of the load upon it. This shield may be made of metal, or some other substance possessing the requisite qualities, and may be formed in one piece, or composed of two or more rings secured together. It is preferable to make it of separable rings when it is intended for use on the wheels of large automobiles, so as to enable the device to be readily applied to and removed from a tire while the tire is secured to the rim of a wheel. The tire of a large automobile is so stiff that when it is on a wheel a shield consisting of a single ring, having the form illustrated in Fig. 3, cannot be forced on or off such a tire, except possibly with very great trouble.

The invention is shown applied to a common automobile-wheel 1, the parts 2 and 3 being respectively the rim and pneumatic tire. The particular shield represented in Figs. 1 and 2 is composed of two rings, 4 and 5, fastened together with several bolts such as the bolt 6. These rings fit together on and near the plane which is midway between the edges of the shield. They are provided with tongues and grooves 7 and 8 which engage with one another.

In Fig. 3 a shield 9 which is made in one piece is shown. A shield so made is preferred to one composed of a plurality of rings, provided a tire to which the protecting device is to be applied is flexible enough to render it easy to insert the deflated tire in a shield of a single piece.

Figure 5:
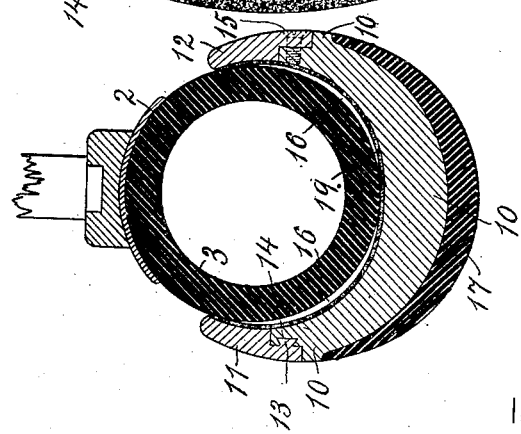

The shield illustrated in Figs. 4 and 5 is composed of a ring 10 and two smaller rings 11 and 12. The smaller rings, which are of the same size, have on them dovetailed projections 13 which fit in recesses 14 cut in the larger ring 10, these recesses being so formed that when the rings 11 and 12 are turned on the ring 10, after the dovetailed projections have been inserted in the recesses, the smaller rings are attached to the other. They are prevented from working loose by means of screws 15 extending through portions of the rings 11 and 12 into the ring 10.

Similar dovetailed projections and recesses might be substituted for the tongues and grooves 7 and 8 shown in Fig. 2.

In whichever of the three forms described the shield is made its internal diameter at each edge is less than its internal diameter midway between its edges, the latter diameter being substantially equal to the external diameter of the tire, and the diameter at each edge being preferably less than the external diameter of the tire by a little more than the tire's tubular diameter.

The shield is secured on the tire by expanding the tire within the shield, which is made to fit close to the tire at the edges of the shield. The separable rings of a shield may be put together from opposite sides of the tire, and may be separated to enable the shield to be removed from the tire.

The shape in cross-section of the shield is preferably convexo-concave as shown or approximately such, and it is desirable that its internal surface should recede from the tire on each side of the innermost portion of the shield, so that spaces 16 or others similar may be provided within the shield to enable the tire to change its shape in the shield under pressure, although the shield makes contact midway between its edges with the outermost portion of the tire.

The shield described is preferably faced on its exterior surface with rubber or flexible material containing rubber. This material 17 may be cemented or otherwise secured to the shield. When it is applied to the form of shield shown in Figs. 1 and 2 it must be divided along the meeting edges of the rings 4 and 5, where it may be clamped in a recess 18 between the rings of the shield.

The shield may be used however without the flexible facing, and may or may not be provided with a lining 19 as shown in Fig. 5.

Because the shield shown and described envelops all of that portion of a tire which is outside of the cylinder of which the axis of the tire-tube is an element, or in other words envelops more than one half of the external surface of the tire, and because the internal surface of the shield recedes from the tire on each side of the innermost portion of the shield as explained, this protecting device has several peculiar advantages each of which is important. (1) It is so secured to the tire as to obviate danger of its becoming detached therefrom although the vehicle may be driven at high speed around corners and over rough roads. (2) It so reinforces the tire as to aid in preventing a hard shock from bursting it. (3) It enables a vehicle to be safely run at moderate speed even if the tire is deflated. (4) It enables the tire to yield adequately without bending outward over the edges of the shield, so that the tire is not subjected to injurious wear where it makes contact with the shield next to the edges thereof. (5) It may be applied to wheels such as are commonly and extensively used without rendering it necessary to alter their form or construction, or making them unsightly, and is capable of thoroughly protecting the tires of such wheels.

It is to be understood that a device embodying the invention may differ somewhat in cross-sectional form from the device or devices shown herein, and may comprise rings differing with respect to their relative sizes from the particular rings of the illustrated device or devices containing a plurality of rings.

Having thus described my invention, what I claim as new and desire to secure by Letters Patent, is:

1. A tire-protecting device comprising a stiff annular shield whose internal diameter at each edge is less than the external diameter of the tire inflated, and which normally makes contact along its edges with both sides of the tire and between its edges with the outermost portion of the tire, and whose internal surface recedes from the tire on each side of the innermost portion of the shield, the stiff material of the shield increasing in thickness from the edges to the outermost portion of the shield.

2. A tire-protecting device comprising a stiff inexpansible annular shield whose internal diameter at each edge is less than the external diameter of the tire inflated, and which envelops more than one half of the external surface of the tire, and normally makes contact with the tire along the edges and midway between the edges of the shield, the stiff material of the shield being divided into separable parts.

3. A tire-protecting device comprising a stiff annular shield whose internal diameter at each edge is less than the external diameter of the tire inflated, and which envelops more than one half of the external surface of the tire, and normally makes contact with the tire along the edges and midway between the edges of the shield, and whose internal surface recedes from the tire on each side of the innermost portion of the shield.

4. A tire-protecting device comprising a stiff annular shield whose internal diameter at each edge is less than the external diameter of the tire inflated, and which normally makes contact along its edges with both sides of the tire and between its edges with the outermost portion of the tire and whose internal surface recedes from the tire on each side of the innermost portion of the shield, said shield being composed of separable parts and its edges being formed on different parts.

5. A tire-protecting device comprising a stiff annular shield whose internal diameter at each edge is less than the external diameter of the tire inflated, and which envelops more than one half of the external surface of the tire, and normally makes contact with the tire along the edges and between the edges of the shield, said shield being composed of separable parts and its edges being formed on different parts.

6. A tire-protecting device comprising a stiff annular shield whose internal diameter at each edge is less than the external diameter of the tire inflated, and which envelops more than one half of the external surface of the tire, and normally makes contact with the tire along the edges and midway between the edges of the shield, and whose internal surface recedes from the tire on each side of the innermost portion of the shield, said shield being composed of separable parts and its edges being formed on different parts.

7. A tire-protecting device comprising a stiff annular shield whose internal diameter at each edge is less than the external diameter of the tire inflated, and which normally makes contact along its edges with both sides of the tire and between its edges with the outermost portion of the tire said shield comprising a ring which forms the larger and outermost portion of the shield, and a smaller ring separably secured to the other and extending inward therefrom, the inner edge of this smaller ring forming one of the edges of the shield.

8. A tire-protecting device comprising a stiff annular shield whose internal diameter at each edge is less than the external diameter of the tire inflated, and which envelops more than one half of the external surface of the tire, and normally makes contact with the tire along the edges and between the edges of the shield, said shield comprising a ring which forms the larger and outermost portion of the shield, and a smaller ring separably secured to the other and extending inward therefrom, the inner edge of the smaller ring forming one of the edges of the shield.

9. A tire-protecting device comprising a stiff annular shield whose internal diameter at each edge is less than the external diameter of the tire inflated, and which envelops more than one half of the external surface of the tire, and normally makes contact with the tire along the edges and midway between the edges of the shield, and whose internal surface recedes from the tire on each side of the innermost portion of the shield, said shield comprising a ring which forms the larger and outermost portion of the shield, and a smaller ring separably secured to the other and extending inward therefrom, the inner edge of this smaller ring forming one of the edges of the shield.

10. A tire-protecting device comprising a stiff annular shield whose internal diameter at each edge is less than the external diameter of the tire inflated, and which normally makes contact along its edges with both sides of the tire and between its edges with the outermost portion of the tire, said shield being composed of a ring which forms the larger and outermost portion of the shield, and two smaller rings separably secured to the other and extending inward therefrom, the inner edges of these smaller rings forming the edges of the shield.

11. A tire-protecting device comprising a stiff annular shield whose internal diameter at each edge is less than the external diameter of the tire inflated, and which envelops more than one half of the external surface of the tire and normally makes contact with the tire along the edges and between the edges of the shield, said shield being composed of a ring which forms the larger and outermost portion of the shield, and two smaller rings separably secured to the other and extending inward therefrom, the inner edges of the smaller rings forming the edges of the shield.

12. A tire-protecting device comprising a stiff annular shield whose internal diameter at each edge is less than the external diameter of the tire inflated, and which envelops more than one half of the external surface of the tire and normally makes contact with the tire along the edges and midway between the edges of the shield, and whose internal surface recedes from the tire on each side of the innermost portion of the shield, said shield being composed of a ring which forms the larger and outermost portion of the shield, and two smaller rings separably secured to the other and extending inward therefrom, the inner edges of these smaller rings forming the edges of the shield.

13. A tire-protecting device comprising a stiff annular shield whose internal diameter at each edge is less than the external diameter of the tire inflated, said shield comprising a ring which forms the larger and outermost portion of the shield, and a smaller ring separably secured to the other and extending inward therefrom, the inner edge of this smaller ring forming one of the edges of the shield, and said shield being faced with flexible material secured to the larger ring only.

14. A tire-protecting device comprising a stiff annular shield whose internal diameter at each edge is less than the external diameter of the tire inflated, said shield being composed of a ring which forms the larger and outermost portion of the shield, and two smaller rings separably secured to the other and extending inward therefrom, the inner edges of these smaller rings forming the edges of the shield, and said shield being faced with flexible material secured to the larger ring only.

LEONARD H. KINNARD.

In presence of—
    JOHN L. BATES,
    ROLLIN S. CHAMBERLIN.